(12) United States Patent
Beck et al.

(10) Patent No.: US 7,565,529 B2
(45) Date of Patent: Jul. 21, 2009

(54) SECURE AUTHENTICATION AND NETWORK MANAGEMENT SYSTEM FOR WIRELESS LAN APPLICATIONS

(75) Inventors: Justin M. Beck, Mesa, AZ (US); Chad L. Swensen, Mesa, AZ (US)

(73) Assignee: Directpointe, Inc., Lindon, UT (US)

( * ) Notice: Subject to any disclaimer, the term of this patent is extended or adjusted under 35 U.S.C. 154(b) by 456 days.

(21) Appl. No.: 11/071,071

(22) Filed: Mar. 3, 2005

(65) Prior Publication Data

US 2006/0072527 A1 Apr. 6, 2006

Related U.S. Application Data

(60) Provisional application No. 60/549,959, filed on Mar. 4, 2004.

(51) Int. Cl.
*H04L 9/00* (2006.01)
*H04L 9/32* (2006.01)
*G06F 15/16* (2006.01)
*G06F 17/30* (2006.01)
*G06F 7/04* (2006.01)
*G06F 7/58* (2006.01)
*G06K 19/00* (2006.01)
*G06K 9/00* (2006.01)
*H04K 1/00* (2006.01)
*G06Q 99/00* (2006.01)
*G06F 15/173* (2006.01)

(52) U.S. Cl. .................. 713/156; 713/168; 713/173; 713/185; 726/9; 726/29; 705/55; 709/225

(58) Field of Classification Search .............. 713/168, 713/173, 185, 156; 726/9, 29; 705/55; 709/225
See application file for complete search history.

(56) References Cited

U.S. PATENT DOCUMENTS

| 6,549,906 B1 | 4/2003 | Austin et al. |
| 6,611,913 B1 | 8/2003 | Carroll et al. |
| 6,658,500 B1 | 12/2003 | Pinault |

(Continued)

OTHER PUBLICATIONS

Cisco Systems, Inc. "Cisco Safe: Wireless LAN Security in Depth", 2003 (76 pages).*

(Continued)

*Primary Examiner*—Michael J Simitoski
(74) *Attorney, Agent, or Firm*—Blynn L. Shideler; Krisanne Shideler; BLK Law Group (57) ABSTRACT

An authentication and network management system for Wi-Fi local area networks includes a network management device and a plurality of Wi-Fi local area networks coupled to the network management device. Each local network includes at least one access point device having a Wi-Fi radio. A plurality of end user devices are attachable to the network forming nodes thereof, and each end user device has input plugs, such as USB ports and the like, for coupling accessories thereto. An authentication device is provided in the network for authenticating the end user devices attached to the network. A plurality of authenticating keys is provided, with each key attachable to an input plug of an end user device. Each key contains a validation certificate therein, wherein the authentication device verifies the presence of a current validation certificate on a key coupled to the end users device prior to granting access to the network.

15 Claims, 1 Drawing Sheet

U.S. PATENT DOCUMENTS

| | | | |
|---|---|---|---|
| 6,662,221 | B1 | 12/2003 | Gonda et al. |
| 6,665,719 | B1 | 12/2003 | Isoda |
| 6,671,726 | B1 | 12/2003 | Hanway |
| 6,675,196 | B1 | 1/2004 | Kronz |
| 6,684,269 | B2 | 1/2004 | Wagner |
| 6,687,831 | B1 | 2/2004 | Albaugh et al. |
| 7,149,896 | B1* | 12/2006 | Bahl et al. ............ 713/166 |
| 7,158,803 | B1* | 1/2007 | Elliott ................ 455/512 |
| 2002/0035699 | A1* | 3/2002 | Crosbie ............... 713/201 |
| 2002/0136226 | A1* | 9/2002 | Christoffel et al. ...... 370/401 |
| 2003/0061364 | A1 | 3/2003 | Banerjee et al. |
| 2003/0120767 | A1* | 6/2003 | Morimoto ............. 709/223 |
| 2003/0194988 | A1* | 10/2003 | Knox ................. 455/406 |
| 2003/0202497 | A1 | 10/2003 | Csapo |
| 2003/0207668 | A1* | 11/2003 | McFarland et al. ...... 455/3.01 |
| 2004/0022186 | A1 | 2/2004 | Kump et al. |
| 2004/0054905 | A1* | 3/2004 | Reader ............... 713/171 |
| 2004/0068653 | A1* | 4/2004 | Fascenda ............. 713/168 |
| 2004/0073672 | A1* | 4/2004 | Fascenda ............. 709/225 |
| 2004/0073797 | A1* | 4/2004 | Fascenda ............. 713/171 |
| 2004/0103317 | A1* | 5/2004 | Burns ................ 713/201 |
| 2004/0106403 | A1* | 6/2004 | Mori et al. .......... 455/426.2 |
| 2004/0106433 | A1* | 6/2004 | Ooki et al. ........... 455/561 |
| 2004/0125553 | A1* | 7/2004 | Castell et al. ........ 361/683 |
| 2004/0179512 | A1* | 9/2004 | Leblanc et al. ........ 370/352 |
| 2004/0225898 | A1* | 11/2004 | Frost et al. .......... 713/201 |
| 2005/0033968 | A1* | 2/2005 | Dupouy et al. ........ 713/183 |
| 2005/0050352 | A1* | 3/2005 | Narayanaswami et al. .. 713/201 |
| 2005/0063333 | A1* | 3/2005 | Patron et al. ......... 370/329 |
| 2005/0074122 | A1* | 4/2005 | Fascenda ............. 380/258 |
| 2005/0086468 | A1* | 4/2005 | Meandzija et al. ...... 713/156 |
| 2005/0091483 | A1* | 4/2005 | Fascenda ............. 713/153 |
| 2005/0102509 | A1* | 5/2005 | Fascenda ............. 713/165 |
| 2005/0188194 | A1* | 8/2005 | Fascenda ............. 713/155 |
| 2006/0007897 | A1* | 1/2006 | Ishii ................. 370/338 |
| 2006/0168653 | A1* | 7/2006 | Contrera ............. 726/9 |

OTHER PUBLICATIONS

Knorr, Eric. The PC Bible, 1995 Peachpit Press, pp. 53-55.*
BlueSoleil. "BlueSoleil Software & Bluetooth USB Dongle", Jun. 2003.*
Loutrel, Marc et al. "A smartcard for authentication in WLANs", 2003 ACM.*
MIStupid.com. "Sierra Wireless AirCard 510/Sprint PCS", retrieved from archive.org, archive date Feb. 2002.*

* cited by examiner

SECURE AUTHENTICATION AND NETWORK MANAGEMENT SYSTEM FOR WIRELESS LAN APPLICATIONS

RELATED APPLICATIONS

The present claims the benefit of U.S. Provisional Patent Application Ser. No. 60/549,959 entitled "SECURE AUTHENTICATION AND NETWORK MANAGEMENT SYSTEM FOR WIRELESS LAN APPLICATIONS" filed Mar. 4, 2004.

BACKGROUND OF THE INVENTION

1. Field of the Invention

The present invention relates to an authentication system for a wireless LAN application, and more particularly, to a comprehensive authentication and network management system for Wi-Fi LANs.

2. Background Information

LAN stands for "local area network" is generally a computer network generally spanning a relatively small area, such as in an office or a home and are capable of transmitting data at very fast rates. Most LANs are confined to a single building or group of buildings. However, one LAN can be connected to other LANs over distances via telephone lines and radio waves, forming a wide area network or WAN. Most LANs connect end user devices such as workstations and personal computers, known as nodes of a network. Each node (e.g. individual end user device) in a LAN has its own CPU with which it executes programs, but it also is able to access data and devices anywhere on the LAN. This means that many users can share devices, such as printers, as well as data. Users can also use the LAN to communicate with each other, by sending e-mail, or chat sessions or the like.

There are many different types of LANS. LANS can be differentiated by topology, which is the geometric arrangement of devices on the network, such as a ring arrangement or in a straight line arrangement; protocols which are the rules and encoding specifications for sending data; and connection media such as twisted pair wire, coaxial cables, fiber optic or wireless.

The wireless LANs are also referred to as WLANs with Wi-Fi being the dominant WLAN standard. A Wi-Fi WLAN will typically connect two or more computers or other devices over a short distance such as 100 to 500 feet, as within an office, a home or a "hot spot" (discussed below). A wireless wide area network, or WWAN, is a wireless network that covers a broad area, such as an entire city. WWANs operated by major wireless carriers provide voice and relatively low-bandwidth data service over a broad area, require hundreds of communications towers and special spectrum licenses from the government and cost hundreds of millions or billions of dollars to establish and maintain.

Wi-Fi is a contraction of "wireless fidelity" and is a global technical standard for wireless LANs. Wi-Fi is used generically when referring of any type of 802.11 standard network (discussed below), whether an 802.11b standard, an 802.11a standard, an 802.11g standard, a dual-band standard, or the like. Typically, any Wi-Fi product using the same radio frequency (for example, 2.4 GHz for the 802.11b or 11g standards, 5 GHz for the 802.11a standard) will work with any other. Formerly, the term Wi-Fi was used only in place of the 2.4 GHz 802.11b standard, however the general meaning of the term has been expanded. An advantage with the universal Wi-Fi standards is that virtually anyone can set up a low-cost Wi-Fi network and cover a home, an office or a public space to provide network access such as high speed wireless Internet access that is more than 100 times faster than a typical dial-up modem connection.

The term "802.11" refers to a family of specifications developed by the Institute of Electrical and Electronics Engineers, or IEEE, for WLAN technology. The 802.11 standard specifies an over-the-air interface between a wireless client and a base station or between two wireless clients. There are a number of distinct specifications in the 802.11 family.

The 802.11 standard applies to wireless LANS and provides 1 or 2 Mbps transmission in the 2.4 GHz band using either Frequency Hopping Spread Spectrum (FHSS) or Direct Sequence Spread Spectrum (DSSS). The 802.11a standard is an extension to the 802.11 standard that applies to wireless LANs and provides up to 54 Mbps in the 5 GHz band and uses an orthogonal frequency division multiplexing encoding scheme rather than FHSS or DSSS. The 802.11b standard is also an extension to the 802.11 standard that applies to wireless LANS and provides 11 Mbps transmission (with a fallback to 5.5, 2 and 1 Mbps) in the 2.4 GHz band with 802.11b using only DSSS. The 802.11b standard is the "original" Wi-Fi standard and still accounts for the bulk of all Wi-Fi equipment sold. The 802.11g standard applies to wireless LANs and provides 20+ Mbps in the 2.4 GHz band.

The 802.11g standard is backward compatible with 802.11b standard access points, or APs (discussed below). In other words, an 802.11g standard radio will connect to both 802.11g standard and 802.11b standard APs. The 802.11a standard is not compatible with the 802.11b standard or the 802.11g standard, such that an 802.11a standard radio can only communicate with an 802.11a standard AP. However, many Wi-Fi PC cards now support both the 802.11b/g standards and the 802.11a standard. A new standard is emerging named 802.16 which will provide WWAN with higher speeds than current wireless carrier networks. Additional advantages for the 802.16 standard include the need for much less equipment as well as operation in an unlicensed spectrum, which dramatically decreases infrastructure deployment costs.

An Access point, or AP, is a hardware device or a computer's software that acts as a wireless communication hub or "base station" that transmits and receives Wi-Fi wireless data traffic. An AP is usually attached to a wired LAN which is connected to a specific network, most typically through a router back to the Internet. APs in a typical system are used for providing wireless security as well as for extending the physical range of service a wireless user has access to.

An infrastructure mode is an 802.11 standard networking framework in which devices communicate with each other by first going through an AP. In infrastructure mode, wireless devices can communicate with each other or can communicate with a wired network. Infrastructure mode is contrasted with Ad-hoc mode in which devices in an 802.11 standard network communicate directly with each other, without the use of an AP (e.g. a wireless peer-to-peer mode).

APs in general, and particularly APs that are open to the public, are also called "Hot Spots" with those running APs referred to as Hot Spot Operators or HSOs. Commercial hot spots are generally found in a public location such as a cafe, hotel, airport, book store, office building lobby, park or convention center (referred to as venues) and will contain one or more Wi-Fi access points and access control devices that users can connect to for a fee to gain access to the network that typically offers high-speed wireless access. A free amenity hot spot is a venue offering wireless Internet (or other network) access for free to its patrons and/or the general public. A free amenity hot spot is different than a free community hot spot in that it is set up in a commercial location and is typically intended as a benefit for the patrons of that location. For example, a cafe or hotel may elect to offer wireless access to its patrons for free as a competitive measure. In contrast, a free community hot spot is generally located in a home, park, street corner or other location and also offers wireless access for free. Free community hot spots are established by individuals or groups working to provide free Internet access to a local area rather than as part of a commercial establishment.

A hot spot aggregator, or simply an aggregator, is one who operates several hot spots combining them into a larger, seamless network. Venue owners contract with hot spot aggregators who deploy access points, access control devices (discussed below) and high speed Internet links into their locations. Hot spot aggregators share revenue and/or costs with the venue owner.

Any network, including Wi-Fi networks, will need to control what computer resources specific users have access to and will generally need to keep track of the activity of users over the network. Authentication is the process of identifying an individual, usually relying upon on a username and password. Authentication is based on the idea that each individual user will have unique information that sets him or her apart from other users. Authorization is the process of granting or denying a user access to network resources once the user has been authenticated, such as through the username and password. The amount of information and the amount of services the user has access to depend on the user's authorization level. Finally, accounting is the process of keeping track of a user's activity while accessing the network resources, including the amount of time spent in the network, the services accessed while there and the amount of data transferred during the session. Accounting data is used for trend analysis, capacity planning, billing, auditing and cost allocation. In computer technology, an "identity" is the unique name of a person, device, or the combination of both that is recognized by a system. Many types of network management systems rely on unique identities to ensure the security of the network and its resources.

A virtual private network, or VPN, is a network that is constructed by using public connections (e.g. wires or wireless couplings) to connect devices of a network. A VPN provides a system for securing transmissions across TCP/IP networks (discussed below). A VPN is a secure "tunnel" between two points on the network, through which all traffic is encrypted and secure. For example, VPN software running on a laptop computer can establish a secure connection from the laptop, across the Internet to a VPN server behind a corporate firewall thousands of miles away. Such systems use encryption and other mechanisms (e.g. passwords) to try and ensure that only authorized users can access the network and that the data cannot be intercepted. A VPN overcomes the inherent insecurity in hot spots, which, unlike corporate Wi-Fi networks, generally broadcast without Wi-Fi's encryption capability enabled in order to allow users to easily connect to them.

An access control device is a piece of network equipment typically installed in a commercial hot spot location between one or more APs and the router that connects back to the Internet. The access control device ties into one or more authentication systems and controls who can get access through the wireless network to the Internet. In commercial hot spots, it serves as a Wi-Fi "cash register", ensuring that only paying users can access the system, and obviously a critical component of a commercial hot spot.

A Wi-Fi radio is a set of computer chips and an antenna that can send and receive Wi-Fi transmissions from a wireless device, such as a laptop, PDA, cell phone, access point, or the like. A Wi-Fi PC Card contains a Wi-Fi radio that can be used by a laptop computer and can be added to a laptop computer to provide Wi-Fi capabilities. A PC card, or PCMCIA {which stands for Personal Computer Memory Card International Association} card, is a lightweight, removable credit-card sized module that adds features to a portable computer. PCMCIA Wi-Fi cards provide inexpensive Wi-Fi capability to laptops and PDAs. Wi-Fi access points also contain one or more Wi-Fi radios. Wi-Fi radios are becoming very inexpensive and will soon be standard in laptops, and other consumer electronics devices such as cars. Wi-Fi radio manufacturers include Intersil, Intel, Atheros, Broadcom, Texas Instruments and Agere.

A "Service Set Identifier", or SSID is the name given to a Wi-Fi network by the person who sets up an access point. The SSID can be set to broadcast, in which case it can be detected and displayed to the user by "sniffer software". Sniffer software is software that "sniffs" the airwaves for Wi-Fi signals (or other network signals such as 2.5G), displays them to the user and lets the user connect to them. Basic Wi-Fi sniffer software is built into existing operating systems such as Windows XP and Apple OSX. Further, when a user connects to a commercial hot spot, and opens a Web browser on their computer, the access control device in that location will generate a Web page that "splashes" up on their computer, known as a splash page. The splash page provides information from the hot spot operator of that location on how to log in or sign up.

Code Division Multiple Access, or CDMA, is a digital cellular technology that uses spread-spectrum techniques in which individual conversations are encoded with a pseudo-random digital sequence. In the US, Sprint and Verizon both use CDMA technology. Global System for Mobile Communications, or GSM, is another one of the leading digital cellular systems. GSM uses narrowband Time Division Multiple Access, or TDMA, which allows eight simultaneous calls on the same radio frequency. Unlike these other wireless technologies such as CDMA and GSM, Wi-Fi enjoys 100% global acceptance. It is becoming known as the "TCP/IP of wireless". In other words it is the single wireless networking standard for all developers, equipment manufacturers, service providers and users. The term "TCP/IP" refers to "Transmission Control Protocol/Internet Protocol" and is the set of standards for how computers and other devices communicate with each other over networks. TCP/IP originated in the 1970's and allowed computers from different manufacturers to talk to each other in a common way for the first time becoming the foundation of the Internet. As with TCP/IP, any innovation in Wi-Fi benefits everyone else in the Wi-Fi community.

Hundreds of original equipment manufacturers, or OEMs, produce and distribute Wi-Fi radios and access points. The single Wi-Fi standard ensures these devices all interoperate with each other, so, for example, an access point made by Sweet Spot Solutions will communicate with a network card from Linksys. In the computer industry, an OEM is typically any company that makes equipment that is sold through a reseller to end users, including desktop computers, laptops and networking equipment such as routers and Wi-Fi PCMCIA cards (or Wi-Fi PC cards) and access points. OEMs include Dell, Sweet Spot Solutions, Sony, Apple, Proxim, Linksys and Cisco.

OEMs are now flooding the market with millions of Wi-Fi PC cards and access points. The single Wi-Fi standard ensures these devices all interoperate with each other, for example, an access point made by Sweet Spot will communicate with a network card from Netgear. Wi-Fi components are now on a consumer adoption price curve. Rapid commoditization of Wi-Fi components has triggered steep declines in the price of Wi-Fi equipment. APs were recently over $1,000, but are $100 or less today, and Wi-Fi cards that were recently $700 now regularly sell for under $50.

As prices have dropped, demand for accessory review Wi-Fi equipment has soared, resulting in millions of private Wi-Fi devices being deployed in offices and homes. One limiting factor is the security of the Wi-Fi networks. A proposed IEEE 802.11i standard is intended to plug some known security holes in IEEE 802.11 wireless LANs, but will not make the Wi-Fi networks completely secure. In order to maximize security in Wi-Fi networks there have to be mechanisms to make sure the data is really coming from its supposed source, that it can't be seen and that it can't be modified. The proposed 802.11i standard will include a system for creating fresh keys at the start of each session. It also will provide a way of checking packets to make sure they are part of a current session and not repeated by hackers to fool network users, Walker said. To manage keys, it will use RADIUS (Remote Access Dial-In User Service) to authenticate users and the IEEE 802.1x standard. Another security upgrade coming soon is known as the WPA (Wireless Protected Access) standard, a specification adopted by the Wi-Fi Alliance. These proposed improvements do not address all of the security issues with Wi-Fi networks.

WEP is short for Wired Equivalent Privacy, and is a security protocol for wireless local area networks. WEP is designed to provide the same level of security as that of a wired LAN. WEP aims to provide security by encrypting data over radio waves so that it is protected as it is transmitted from one end point to another. However, it has been found that WEP is not as secure as once believed. With WEP, a passive network attack takes advantage of several WEP weaknesses in the key-scheduling algorithm of RC4 and allows almost anyone with a WLAN-enabled laptop and some readily available "promiscuous" network software to retrieve a network's key, thereby gaining full user access in less than 15 minutes. It scales linearly with the number of bits used making little to no difference if the key increases to 128 bits.

Many existing Wi-Fi networks don't even utilize, basic protection against "war driving," in which interlopers drive by buildings or park outside and intercept wireless LAN traffic. As a partial defense against "war driving," users can utilize the WEP encryption that is already built in to Wi-Fi devices. For additional protection, users can implement user authentication and dynamic WEP, with keys that change, to protect themselves from "script kiddies," which references those (often teenagers) who use packaged hacking tools to infiltrate systems. Existing authentication systems include EAP-TLS (Extensible Authentication Protocol-Transport Level Security), PEAP (Protected EAP), or Cisco's LEAP (Lightweight EAP), which Cisco introduced as part of an effort to boost its own products' security beyond WEP. Strong encryption systems are also available such as TKIP (Temporal Key Integrity Protocol), which will be used in WPA and 802.11i, or CKIP (Cisco Key Integrity Protocol), a proprietary implementation of the 802.11i recommendations that Cisco developed as a stop-gap measure.

U.S. Pat. No. 6,658,500 discloses an authentication system for a communications network (cable, cellular, cordless or land line telephony systems) in which a microchip card for the device is used for permitting access. This proposed security system is not identified for or practical for Wi-Fi networks. Another security system for cellular networks is described in U.S. Pat. No. 6,611,913 describing an escrowed key distribution system for authentication keys.

U.S. published patent application U.S. 2004/0022186 to Kump et al proposes a Wi-Fi network in which will monitor access points and then identify unauthorized access points and finally apply filters to the flow of data through the unauthorized access points. The solution requires the ability to accurately detect unauthorized nodes and does not adequately prevent the access of such unauthorized nodes to begin with.

As identified above, there is a need in the industry to address the perceived security weaknesses of Wi-Fi networks to fully expand the potential of such networks. It is an object of the present invention to provide a comprehensive authentication and network management system for Wi-Fi LANs that addresses the security issues of users. It is another object of the present invention to provide a comprehensive authentication and network management system for Wi-Fi LANs that provides a turn key authentication system for hot spot operators which operate within the hot spot. It is another object of the present invention to provide a comprehensive authentication and network management system for Wi-Fi LANs that simplifies the management of a variety of distinct hot spots. It is another object of the present invention to provide a comprehensive authentication and network management system for Wi-Fi LANs that is economically manufactured and easily usable with a variety of hot spot business applications.

SUMMARY OF THE INVENTION

The above objects are achieved with a comprehensive authentication and network management system for Wi-Fi LANs according to the present invention. The system includes a network management device and a plurality of Wi-Fi local area networks coupled to the network management device. Each local network includes at least one access point device having a Wi-Fi radio. A plurality of end user devices, such as laptops, PDAs or any end user Wi-Fi capable device, are attachable to the network forming nodes thereof, and each end user device has input plugs, such as USB ports and the like, for coupling accessories thereto. An authentication device is provided in the network for authenticating the end user devices attachable to the network. A plurality of physical authenticating keys is provided, with each key attachable to an input plug of an end user device. Each key contains a validation certificate therein, wherein the authentication device verifies the presence of a current validation certificate on a key coupled to the end users device prior to granting access to the network.

In one embodiment of the present invention, each key establishes a virtual private network tunnel between the key and the authentication device for the authentication process. Further, each key is generally the size of a conventional key for a mechanical lock (e.g. a house key or a car key) and is on the order of 1" to 5". Each key may include indicia thereon indicative of the Wi-Fi wireless local area network operator. Each key may attach to a universal serial bus port of the end user device.

The management device preferably maintains an active directory of valid certificates of the keys and will communicate this list to the authentication device. The network management device may be coupled to the authentication device through the internet. In another embodiment of the present invention the access point device further includes a signal amplifier therein.

Another function of the physical, plug in authenticating key is the incorporation of a personal profile on an individual's key. The inclusion of a personal profile on the key allows the key to grant privileges, i.e. differentiated network access, on the network associated with the particular user to whom the key is assigned, referred to as profile management. This system works particularly well in multi-computer environment. Further, this system supplements the profile management tool of a PIN/password now commonly used for differentiating levels of access between users of a network.

A further function of the physical, plug in authenticating key is the incorporation of a network protection software, e.g. anti-virus, anti-spam, and anti-spyware software, on an individual's key. The key may simply check the user's computer to see if the required software, and updates, are present and then, if the user is not current (up to date with the most recent protection software), the management platform could quarantine the users device and force the updates onto the user's computer, essentially without the need for user intervention. The updated software may come directly from the key, or the key may be used only to verify the presence of the required software and the management platform actually send the updates to the subject machine. Either implementation results in a self-healing network. Almost any software application may be incorporated onto the key. The present invention provides an efficient and effective tool for protecting the integrity and the health of a given network.

These and other advantages of the present invention will be clarified in the description of the preferred embodiments taken together with the attached drawings in which like reference numerals represent like elements throughout.

DETAILED DESCRIPTION OF THE PREFERRED EMBODIMENT

Figure 1:
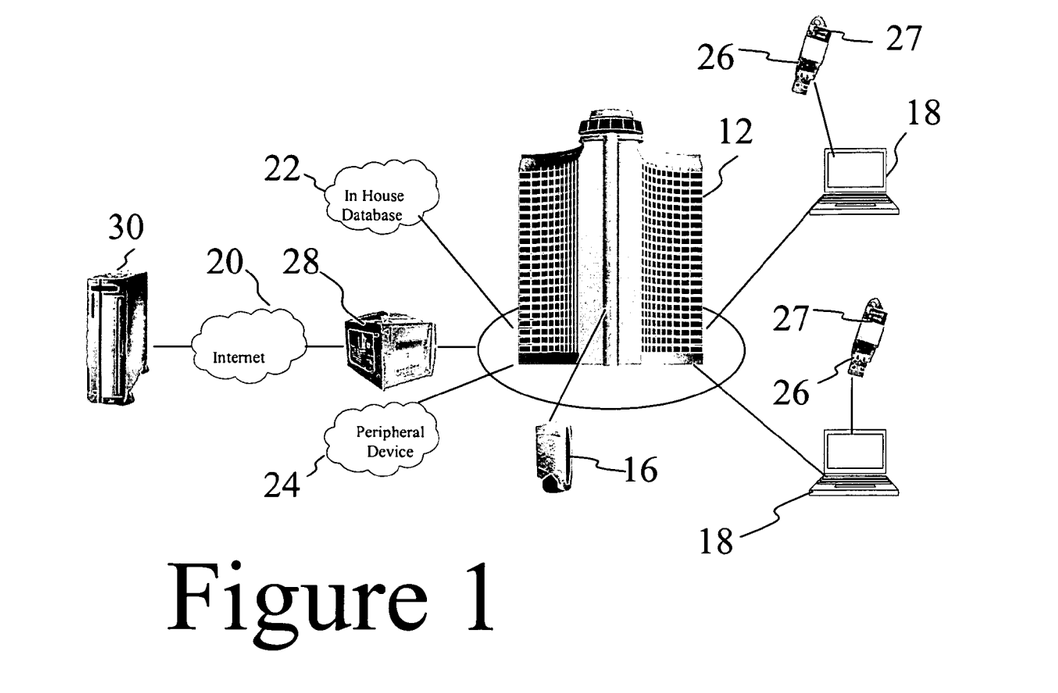
FIG. 1 is a schematic view of a Wi-Fi WLAN having an authentication and network management system according to the present invention.
Figure 2:
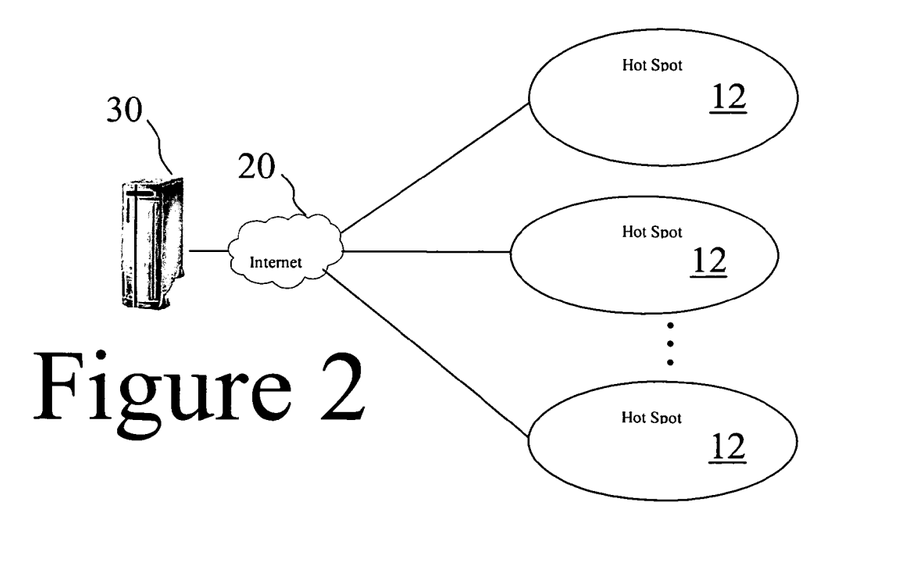
FIG. 2 is a schematic view of the network management system according to the present invention applied to a collection of hot spots.

The present invention provides a Wi-Fi network 10 which is schematically illustrated in FIGS. 1-2. The network 10 provides end-to-end solution to address hardware, security, and authentication as well as network management aspects of Wi-Fi deployment. The network 10 can be used in all WLAN applications, including private wireless networks and both Free Amenity and Connect Fee Hot Spot business models. The present invention is described in connection with a wireless network such as Wi-Fi network 10, and is particularly well suited for such networks, however the functionality of the present invention is applicable to wired networks, and combination wired/wireless networks. These advantages should be apparent from the description of the preferred embodiment.

The network 10 includes a plurality of hot spots 12 as shown in FIG. 2. Each hot spot 12 may be in a single building 14 (e.g. a hotel, cafe or the like), or throughout a collection of buildings (e.g. an office park), or over a given area (e.g. a park setting) as known in the art. Each hot spot 12 includes at least one access point device 16 for the hot spot 12. Each access point device 16 according to the present invention, preferably, combines an 802.11 standard (b/g, a or even the 802.16 standard or eventually the 802.11i standard) radio together with a signal booster amplifier into a single device. Integrating the signal booster amplifier and the Wi-Fi radio into one device, the access point device 16 can provide a larger RF signal footprint than conventional access points. Where the hot spot 12 is covering large facilities (e.g. a college campus or collection of buildings for a business), the hot spot 12 may use multiple access point devices 16 to provide wireless signal throughout the entire facility (i.e. over the entire hot spot 12).

As with conventional Wi-Fi networks, the network 10 is intended to provide users with the ability to access the network 10 with end user devices such as laptops 18 or other designated end user Wi-Fi capable devices (e.g. PDAs or any device with Wi-Fi capabilities). For reference purposes, a PDA, or personal digital assistant, is a common handheld device that combines computing, telephone/fax, Internet and networking features; and a laptop is a small, portable computer which is frequently called a notebook computer. Regarding the network 10, the access may provide the users with high speed access to the internet 20, which is one common business model. Alternatively the purpose of the hot spot 12 of the network 10 may be primarily to grant access to a confidential in house database 22, such as in a hospital or in a research library. Alternatively, a significant purpose of an individual hot spot 12 may be to grant access to specialized equipment 24, such as a color printer. Combinations of these purposes are also common. The intended purpose and primary functions of the hot spots 12 or of the overall network 10 are essentially limitless.

The key features of the network 10 are the authentication and network management devices that are employed. An authenticating device or key 26 is associated with each end user device or node (laptop 18 or other Wi-Fi device) of the network 10. The authenticating device or key 26 is a fully portable USB plug-in authentication device the size of an average house key. The end user devices, such as laptop 18, will include standard input plugs, such as USB ports and the like. "USB" refers to Universal Serial Bus, and is an external bus standard that supports data transfer rates of 12 Mbps. A single USB port can be used to connect peripheral devices, such as mice, modems and keyboards. Each key 26 will plug into a USB port of any end user device, such as laptop 18, to be connected to the hot spot 12. Each key 26 carries a unique electronic validation certificate that authorizes network access and the key 26 easily plugs into the USB port of any device. The authentication device or key 26 within the meaning of the present invention is a physical token which is connectable, e.g. a plug in connection, to a standard input device, e.g. USB port, of an end user device, e.g. laptop 18. The key 26 may, alternatively, use a variety of standard device inputs, including a disc drive, but the USB port has the advantage of being in-obtrusive to the end user, i.e. not tying up a critical input device of the end user's device.

It should be apparent that the physical shape of the key 26 can vary greatly without altering the authenticating function of the key 26. The size of the key 26, about 1"-5" in length, is an important feature of the present invention. Larger size keys 26 would be become unwieldy to the users. The size of the key 26 is easy to carry by the users and it is indicative to the user of the function of the key (i.e. it is sized similar to keys for mechanical locks with which users will be familiar). The size of the key allows for branding of the key by both the venue and the network manager, as evidenced by logo 27 in FIG. 1. The "branding" 27 also allows instructions, if desired, to be conveyed to the user, e.g. "Plug into USB port of device", or "For assistance contact . . . ". The branding 27 is believed to be particularly helpful for commercial public networks, e.g. a cafe or hotel, where the end user keeps the key 26 and is easily reminded of this easy access amenity. It is critical to understand that the security of the system is not compromised by the user maintaining the key 26, as the certificate can be easily "turned off" as needed as identified below.

The network 10 provides a turn-key security and authentication solution to the hot spot 12 by having a Hot Spot authentication device 28 at each Hot Spot location. The authentication device 28 is a "plug and play" device (as are the keys 26) to provide easy hot spot 12 administrations. The term "plug and play" references the ability of a computer system to automatically configure and operate software or an attached device (i.e. the operator need not set DIP switches, jumpers or other configuration elements). The authentication device 28 will be provided with an updatable list of valid certificates associates with valid keys 26. With a key 26 in the USB port of an end user Wi-Fi device, a secure VPN tunnel is created between the authentication device 28 and the node end user device with the key 26. This system does not replace existing systems desired to be utilized by the HSO, such as passwords and WEP type encryption, but works in conjunction therewith.

The final portion of the authentication and network management solution is the provision of a network management device 30 which is coupled to each hot spot 12 through any connection, such as preferably, the internet 20. The management device 30 will manage certificates of the keys 26 for multiple hot spots 12. The management device 30 maintains an active directory of valid certificates and will communicate this list to the authentication device 28 of the specific hot spot 12. It should be apparent that keys 26 will be added and eliminated from the various hot spots 12 in the ordinary course of operation. New keys 26, with new certificates embedded therein, will be added for replacement of old keys and for expansion. Old keys 26 will be lost, not returned to the HSO, or damaged and therefore dropped from the list of valid certificates. The network management device 30 will also receive network outage alarms and other information needed for network management and administration. However the authentication and the accounting aspects of the specific hot spots 12 are accomplished at the hot spot 12 (other than the updating of the lists for valid certificates).

The network 10 secures wireless data transmission meeting HIPAA, FIPS and corporate security standards. A significant advantage of the network 10 is the ability to overcome WEP weaknesses that hinders widespread Wi-Fi deployment, particularly in corporate networks. The network 10 secures wireless data in the hot spot 12 with a "local VPN" between the authentication device 28 and the key 26 that will be on the device 18 of the end client. Even if the WEP security element is compromised in a hot spot 12 of the network 10, the data itself is encrypted in a VPN tunnel. Thus, there is no visibility to data in a wireless transfer. Hacking the network key is further frustrated with the authentication standards of the network.

The network 10 delivers a cost effective solution that enhances the customer experience at the specific hot spots 12 while maintaining a fail safe authentication system. All network features (Internet access, corporate data or applications) are located behind the local authentication device 28 allowing the network to be applicable to any hot spot business model. Without the proper certificate in the key 26 located on the end client (in laptop 18), access to the network 10 is denied. This eliminates the threat from bandwidth hacking, rogue access points and other access breaches that are very common with alternative wireless authentication systems on the market today.

For a public hot spot 12, the customer experience is dramatically enhanced with no need for online billing or entering credit cards each time the network is accessed (although the HSO may elect to utilize similar billing arrangements at his option). Billing of the end users, if any, occurs through the venue. The only step outside of "plug and play" from the user perspective is to install the system driver the first time it is used. The driver is downloaded from the static splash page stored on the local authentication device 28. The centralized network management function of the solution is also simple since authentication takes place at the hot spot 12. There is no need for large data centers or billing applications to run at the aggregator's location. This reduces costs and operations complexity for the network administration and allows the network 10 to service a large variety of hot spots 12. In other words, the network 10 does not require network management costs that are only applicable for certain hot spot types to be distributed over all of the hot spots 12. Network management is limited to maintaining a database of valid certificates and monitoring equipment to ensure proper operation.

The network 10 provides industrial grade broadband wireless infrastructure solutions, including products and services that enable a cost-effective build-out and management of private and public access wireless networks (Hot Spots 12). The network 10 offers a Wi-Fi solution to both private and public network (hot spot 12) operators by providing a unique resolution to security and authentication issues that hinder Wi-Fi deployment.

The authenticating key 26 may further, preferably, incorporate a personal profile associated with the user to which it is granted, particularly where there are levels of access to the network 10. The inclusion of a personal profile on the key 26 allows the key 26 to grant various sets of access, also called network privileges, on the network 10. These privileges would be associated with the particular user to whom the key 26 is assigned, and this is also referred to as profile management. This profile management application works particularly well in multi-computer environment in which different users are granted different levels of access, e.g. managerial level access, administrator access, etc. Further, this profile management aspect of the present invention supplements the profile management tool of a PIN/password now commonly used for differentiating levels of access between users of a network 10.

The authenticating keys 26 may further incorporate network protection software, e.g. anti-virus, anti-spam, and anti-spyware software. The key 26 may simply check the user's computer, or other connected device, to see if the required software, and updates are present on the device. If the associated device is not current with the required level of protection software, e.g. the latest anti-virus update, the management platform could quarantine the particular device from the network access and force the updates onto the user's computer, or other device. This could be accomplished at log-in, essentially without the need for user intervention. The updated software may come directly from the key 26, or the key 26 may be used only to verify the presence of the required software and the management platform actually send the updates to the subject machine. Either implementation results in a self-healing network. Almost any software application may be incorporated onto the key. The present invention provides an efficient and effective tool for protecting the integrity and the health of a given network.

The network 10 may be better explained with a few representative examples. Initially, consider the implementation of a hot spot 12 as an amenity of a hotel. Guests of the hotel are given (or may purchase) the network access with their stay and assigned a key 26. The user may use his device, e.g. laptop 18, and/or the hotel may have devices available such as computers in a business center. The key 26 will essentially remain valid for the length of their stay. The profile management allows for certain keys 26 of selected guests to be granted additional access to the network, such as access to a color printer or large screen monitors in a business center (which one would assume would be for an additional fee or reserved for "preferred customers"). The inexpensive nature of the keys themselves and the fact that the certification of the key will expire, the failure to return a key 26 is not detrimental to the integrity of the system. Further, the "branding" 27 of the key 26 actually suggests the hotel operator will encourage the user to keep the key 26 as a reminder of this particular hotel and this amenity, with the specific certification of a particular key 26 being able to be "reactivated" if the user actually does return for a subsequent stay and returns with the key 26 (of course, a new key can also be easily issued). Finally the key 26 can be used to assure that the minimum level of network protection software is provided on the user's specific device as described above. This gives greater flexibility to the network protection software that may be implemented as it allows the minimum level of security to be pushed down to the end user device level as desired.

A separate example would be a university environment, where the network must accommodate students, administration, faculty and staff requirements that vary greatly. In most university environments the pool of students changes every semester. The use of the present system with individual keys 26 allows a very easy method of keeping track of the changing student population with regard to network access. Again the system is not detrimentally affected if the keys 26 are not returned. Further, this environment highlights the use of the profile management implementation in the keys 26. A faculty member or graduate student in the engineering college may likely have greater access to certain in-house libraries and network resources than does an undergraduate in the humanities college (who may have separate unique accesses as well). Enrolling in particular courses will likely change the profile and the access granted. The university and the hotel example represent situations where the end users are likely to have their own devices, e.g. laptops, as opposed to a business (or even the administration side of the university) which will also provide, and therefor control, the end user devices on the network.

A further example would be in an internal business environment, in which the system allows for easy secure adoption of a wireless network. The profile management items in the present invention would also be particularly useful in such applications, as varied levels of network access are common in business applications, e.g. managerial level access, departmental access (i.e. engineering has different resources on the network than does shipping). It should be noted, again, that the functionality of the present invention remains if it is used in conjunction or exclusively with a wired network, although the advantages of a wireless network are obviously forfeited. The keys 26 may be effectively used in a conventional wired multi-computer network.

It will be apparent to those of ordinary skill in the art that various modifications may be made to the present invention without departing from the spirit and scope thereof. The scope of the present invention is defined by the appended claims and equivalents thereto.

We claim:

1. A Wi-Fi wireless local area network comprising:
At least one access point device having a Wi-Fi radio;
A plurality of end user devices attachable to the network forming nodes thereof, each end user device having input plugs for coupling accessories thereto;
An authentication device for authenticating the end user devices attached to the network; and
A plurality of authenticating keys, with each key attachable to an input plug of an end user device, each key containing a validation certificate therein, wherein the authentication device verifies the presence of a current validation certificate on a key coupled to the end users device prior to granting access to the network, and wherein each key further includes incorporation of a personal profile on an individual's key that grant privileges on the network associated with the particular user to whom the key is assigned, and wherein each key is on the order of 1" to 5" and includes indicia thereon indicative of an operator of the Wi-Fi wireless local area network, and wherein each key further includes network protection software that at least verifies the presence of a minimal level of network protection software on the users device, and wherein if a minimal level of network protection software is not present, the users device is automatically updated prior to the authentication device granting access to the network.

2. A Wi-Fi wireless local area network comprising:
At least one access point device having a Wi-Fi radio;
A plurality of end user devices attachable to the network forming nodes thereof, each end user device having input plugs for coupling accessories thereto;
An authentication device for authenticating the end user devices attached to the network; and
A plurality of authenticating keys, with each key attachable to an input plug of an end user device, each key containing a validation certificate therein, wherein the authentication device verifies the presence of a current validation certificate on a key coupled to the end users device prior to granting access to the network, and wherein each key further includes incorporation of a personal profile on an individual's key that privileges on the network associated with the particular user to whom the key is assigned, and wherein each key further includes network protection software that at least verifies the presence of a minimal level of network protection software on the users device, wherein if a minimal level of network protection software is not present, the users device is automatically updated prior to the authentication device granting access to the network, and wherein the end users on the network are granted access to at least one of i) high speed Internet service, ii) an in house database, and iii) specialized equipment.

3. A Wi-Fi wireless local area network comprising:
At least one access point device having a Wi-Fi radio;
A plurality of end user devices attachable to the network forming nodes thereof, each end user device having input plugs for coupling accessories thereto;
An authentication device for authenticating the end user devices attached to the network; and
A plurality of authenticating keys, with each key attachable to an input plug of an end user device, each key containing a validation certificate therein, wherein the authentication device verifies the presence of a current validation certificate on a key coupled to the end users device prior to granting access to the network, and wherein each key further includes incorporation of a personal profile on an individual's key that grant privileges on the network associated with the particular user to whom the key is assigned, and wherein each key attaches to a universal serial bus port of the end user device, and wherein each key further includes network protection software that at least verifies the presence of a minimal level of network protection software on the users device, and wherein if a minimal level of network protection software on the users device, and wherein if a minimal level of network protection software is not present, the users device is automatically updated prior to the authentication device granting access to the network.

4. A Wi-Fi wireless local area network comprising:
At least one access point device having a Wi-Fi radio;
A plurality of end user devices attachable to the network forming nodes thereof, each end user device having input plugs for coupling accessories thereto;
An authentication device for authenticating the end user devices attached to the network; and
A plurality of authenticating keys, with each key attachable to an input plug of an end user device, each key containing a validation certificate therein, wherein the authentication device verifies the presence of a current validation certificate on a key coupled to the end users device prior to granting access to the network, and wherein each key further includes incorporation of a personal profile on an individual's key that grant privileges on the network associated with the particular user to whom the key is assigned; and further including
a network management device coupled to the authentication device, wherein the management device maintains an active directory of valid certificates of the keys and will communicate this directory to the authentication device, and wherein each key further includes network protection software that at least verifies the presence of a minimal level of network protection software on the users device, and wherein if a minimal level of network protection software is not present, the users device is automatically updated prior to the authentication device granting access to the network.

5. The Wi-Fi wireless local area network as claimed in claim 4 wherein the access point device further includes a signal amplifier therein and wherein the network management device is coupled to the authentication device through the Internet.

6. An authentication and network management system for Wi-Fi wireless local area networks comprising:
A) A network management device; and
B) A plurality of Wi-Fi local area networks coupled to the network management device, each local network including
  i) At lest one access point device having a Wi-Fi radio;
  ii) A plurality of end user devices attatchable to the network forming nodes thereof, each end user device having input plugs for coupling accessories thereto;
  iii) An authentication device for authenticating the end user devices attached to the net work; and
  iv) A plurality of authenticating keys, with each key attachable to an input plug of an end user device, with each key containing a validation certificate therein, each key includes incorporation of a personal profile on an indivisual's key that grant privileges on the network associated with the particular user to whom the key is assinged, therein the authentication device verifies the presence of a current validation certificate on a key coupled to the end users device prior to grating access to the network, and wherein the management device maintains an active directory of valid certificates of the keys and will communicate the directory to the authentication device, and wherein the access point device further includes a signal amplifier therein and therein the network management device is coupled to the authentication device through the Internet, and wherein each key further includes network protection software that at least verifies the presence of a minimal level of network protection software on the users device, and wherein if a minimal level of network protection software is not present, the users device is automatically updated prior to the authentication device granting access to the network.

7. A secure local area network comprising:
A plurality of end user devices attachable to the network forming nodes thereof, each end user device having input plugs for coupling accessories thereto;
An authentication device for authenticating the end user devices attached to the network;
A plurality of authenticating keys, with each key attachable to an input plug of an end user device, each key containing a validation certificate therein, wherein the authentication device verifies the presence of a current validation certificate on a key coupled to the end users device prior to granting access to the network, and wherein each key further includes network protection software that at least verifies the presence of a minimal level of network protection software on the users device, and wherein if a minimal level of network protection software is not present, the users device is automatically updated prior to the authentication device granting access to the network; and
A network management device coupled to the authentication device, wherein the management device maintains an active directory of valid certificates of the keys and will communicate this directory to the authentication device.

8. The secure local area network as claimed in claim 7 wherein each key attaches to a universal serial bus port of the end user device and establishes a virtual private network tunnel between the key and the authentication device for the authentication process.

9. The secure local area network as claimed in claim 7 wherein each key includes incorporation of a personal profile on an individual's key that grant privileges on the network associated with the particular user to whom the key is assigned, and wherein the network is a wireless Wi-Fi network including at least one access point device having a Wi-Fi radio, wherein each key is on the order of 1" to 5" and attaches to a universal serial bus port of the end user device, and wherein the end users on the network are granted access to at least one of i) high speed Internet service, ii) an in house database, and iii) specialized equipment.

10. The secure local area network as claimed in claim 9 further including a profile management tool using a user PIN/password for user network access.

11. An authentication and network management system for Wi-Fi wireless local area networks comprising:
A) A network management device: and
B) A plurality of Wi-Fi local area networks coupled to the network management device, each local network including
  i) At least one access point device having a Wi-Fi radio;
  ii) A plurality of end user devices attachable to the network forming nodes thereof, each end user device having input plugs for coupling accessories thereto;
  iii) An authentication device for authenticating the end user devices attached to the network; and
  iv) A plurality of authenticating keys, with each key attachable to an input plug of an end user device, each key containing a validation certificate therein, each key includes incorporation of a personal profile on an individual's key that grant privileges on the network associated with the particular user to whom the key is assigned, wherein the authentication device verifies the presence of a current validation certificate on a key coupled to the end users device prior to granting access to the network, and wherein the management device maintains an active directory of valid certificates of the keys and will communicate this directory to the authentication device, and wherein the access point device further includes a signal amplifier therein and wherein the network management device is coupled to the authentication device through the Internet, and wherein each key is attached to a USB port of the end user device, establishes a virtual private network tunnel between the key and the authentication device for the authentication process, is on the order of 1" to 5" and includes indicia thereon indicative an operator of the Wi-Fi wireless local area network, and wherein each key further includes network protection software that at least verifies the presence of a minimal level of network protection software on the users device, and wherein if a minimal level of network protection software is not present, the users device is automatically updated prior to the authentication device granting access to the network.

12. An authentication and network management system for Wi-Fi wireless local area networks comprising:
  A) A network management device; and
  B) A plurality of Wi-Fi local area networks coupled to the network management device, each local network including
    i) At least one access point device having a Wi-Fi radio;
    ii) A plurality of end user devices attachable to the network forming nodes thereof, each end user device having input plugs for coupling accessories thereto;
    iii) An authentication device for authenticating the end user devices attached to the network; and
    iv) A plurality of authenticating keys, with each key attachable to an input plug of an end user device, each key containing a validation certificate therein, each key includes incorporation of a personal profile on an individual's key that grant privileges on the network associated with the particular user to whom the key is assigned, wherein the authentication device verifies the presence of a current validation certificate on a key coupled to the end users device prior to granting access to the network, and wherein the management device maintains an active directory of valid certificates of the keys and will communicate this directory to the authentication device, and wherein the access point device further includes a signal amplifier therein and wherein the network management device is coupled to the authentication device through the Internet, and wherein each key further includes network protection software that at least verifies the presence of a minimal level of network protection software on the users device, wherein if a minimal level of network protection software is not present, the users device is automatically updated prior to the authentication device granting access to the network, and wherein the end users on each local network are granted access to at least one of i) high speed Internet service, ii) an in house database, and iii) specialized equipment, and wherein the access point device of each local network further includes a signal amplifier therein.

13. An authentication and network management method for Wi-Fi local area networks having at least one access point device having a Wi-Fi radio and a plurality of end user devices attachable to the network forming nodes thereof, each end user device having input plugs for coupling accessories thereto, the method comprising the steps of:
  Providing an authentication device for authenticating the end user devices attached to the network, and a plurality of authenticating keys, with each key attachable to an input plug of an end user device, each key containing a validation certificate therein, wherein each key further includes network protection software that at least verifies the presence of a minimal level of network protection software on the users device;
  Verifying the presence of a current validation certificate on a key coupled to the end users device with the authentication device prior to granting access to the network;
  Verifying the presence of a minimal level of network protection software on the users device, wherein if a minimal level of network protection software is not present, automatically updating the users device prior to granting access to the network;
  Providing a network management device coupled to the authentication device;
  Maintaining an active directory of valid certificates of the keys on the management device; and
  Communicating this list to the authentication device, wherein the network management device is coupled to the authentication device through the Internet.

14. The authentication and network management method as claimed in claim 13 wherein each key establishes a virtual private network tunnel between the key and the authentication device for the authentication process, and each key is on the order of 1" to 5" in length and includes indicia thereon indicative an operator of the Wi-Fi wireless local area network, and attaches to a universal serial bus port of the end user device, and wherein each key includes incorporation of a personal profile on an individual's key that grant privileges on the network associated with the particular user to whom the key is assigned.

15. The authentication and network management method as claimed in claim 13 further including the step of using a user PIN/password as a profile management tool for user network access.

* * * * *

UNITED STATES PATENT AND TRADEMARK OFFICE
CERTIFICATE OF CORRECTION

PATENT NO. : 7,565,529 B2  Page 1 of 1
APPLICATION NO. : 11/071071
DATED : July 21, 2009
INVENTOR(S) : Justin M. Beck and Chad L. Swensen

It is certified that error appears in the above-identified patent and that said Letters Patent is hereby corrected as shown below:

Column 12 Lines 34 should read
--on as individual's key that grant privileges on the network--

Column 13 Lines 44-64 should read
--i) At least one access point device having a Wi-Fi radio; ii) A plurality of end user devices attachable to the network forming nodes thereof, each end user device having input plugs for coupling accessories thereto; iii) An authentication device for authenticating the end user devices attached to the network; and iv) A plurality of authenticating keys, with each key attachable to an input plug of an end user device, with each key containing a validation certificate therein, each key includes incorporation of a personal profile on an individual's key that grant privileges on the network associated with the particular user to whom the key is assigned, wherein the authentication device verifies the presence of a current validation certificate on a key coupled to the end users device prior to granting access to the network, and wherein the management device maintains an active directory of valid certificates of the keys and will communicate this directory to the authentication device, and wherein the access point device further includes a signal amplifier therein and wherein the network manage--

Signed and Sealed this

Fifteenth Day of September, 2009

David J. Kappos
*Director of the United States Patent and Trademark Office*